United States Patent
Bernath et al.

(10) Patent No.: US 10,988,007 B1
(45) Date of Patent: Apr. 27, 2021

(54) HANGER AND ASSOCIATED HANGER-BASED MOUNTING PACKAGE FOR A SUNROOF ASSEMBLY AND A ROOF CROSSBEAM

(71) Applicants: Aisin Technical Center of America, Inc., Northville, MI (US); Toyota Motor Engineering & Manufacturing North America, Inc., Plano, TX (US)

(72) Inventors: Thomas Bernath, Huntington Woods, MI (US); Joel T. Runyan, Canton, MI (US); Kevin J. James, Saline, MI (US); James D. Cunningham, Clarkston, MI (US)

(73) Assignees: Aisin Technical Center of America, Inc., Northville, MI (US); Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/600,792

(22) Filed: Oct. 14, 2019

(51) Int. Cl.
    *B60J 7/043* (2006.01)
    *B60J 7/05* (2006.01)
    *B60J 7/053* (2006.01)

(52) U.S. Cl.
    CPC ............ *B60J 7/043* (2013.01); *B60J 7/0435* (2013.01); *B60J 7/05* (2013.01); *B60J 7/053* (2013.01)

(58) Field of Classification Search
    CPC ... B60J 7/043; B60J 7/0435; B60J 7/05; B60J 7/053
    USPC ........... 296/203.01, 203.03, 216.01, 216.07, 296/216.08
    See application file for complete search history.

(56) References Cited

U.S. PATENT DOCUMENTS

| | | | | |
|---|---|---|---|---|
| 5,048,890 | A * | 9/1991 | Masuda | B60J 7/022 296/216.08 |
| 10,272,752 | B2 * | 4/2019 | Asano | B60J 7/022 |
| 2006/0261641 | A1 * | 11/2006 | Ida | B60J 7/022 296/216.08 |
| 2009/0127891 | A1 * | 5/2009 | Hirata | B60J 7/022 296/216.08 |
| 2011/0254322 | A1 * | 10/2011 | Adamski | B62D 25/06 296/216.08 |

FOREIGN PATENT DOCUMENTS

JP 2018131057 A 8/2018

* cited by examiner

*Primary Examiner* — Dennis H Pedder
(74) *Attorney, Agent, or Firm* — Christopher G. Darrow; Darrow Mustafa PC (57) ABSTRACT

A mounting package includes a sunroof assembly, a roof crossbeam, and a hanger hanging the roof crossbeam underneath the sunroof assembly. The sunroof assembly includes a guiderail. The hanger includes a lower hook hooked with the roof crossbeam, and an upper hook hooked with the guiderail. The hanger is configured to flexibly accommodate multidirectional movement of the roof crossbeam relative to the guiderail. The multidirectional movement includes lifting movement of the roof crossbeam relative to the guiderail.

20 Claims, 4 Drawing Sheets

HANGER AND ASSOCIATED HANGER-BASED MOUNTING PACKAGE FOR A SUNROOF ASSEMBLY AND A ROOF CROSSBEAM

TECHNICAL FIELD

The embodiments disclosed herein relate to the assembly of vehicles and, more particularly, to mounting sunroof assemblies into vehicles.

BACKGROUND

As part of their roofs, the bodies of some vehicles with sunroof assemblies include not only longitudinally-extending roof rails, but also laterally-extending roof crossbeams, such as side impact beams. In certain vehicles, the sunroof assemblies are mountable to the bodies from below, and the roof crossbeams are mountable into the bodies from below underneath the sunroof assemblies. For mounting purposes, both the sunroof assemblies and the roof crossbeams are securable to the roof rails. Accordingly, both the sunroof assemblies and the roof crossbeams must be lifted underneath their final locations on the roof rails.

SUMMARY

Disclosed herein are embodiments of a hanger and an associated hanger-based mounting package for a sunroof assembly and a roof crossbeam. In one aspect, a mounting package includes a sunroof assembly, a roof crossbeam, and a hanger hanging the roof crossbeam underneath the sunroof assembly. The sunroof assembly includes a guiderail. The hanger includes a lower hook hooked with the roof crossbeam, and an upper hook hooked with the guiderail. The hanger is configured to flexibly accommodate multidirectional movement of the roof crossbeam relative to the guiderail. The multidirectional movement includes lifting movement of the roof crossbeam relative to the guiderail.

In another aspect, a mounting package includes a sunroof assembly, a roof crossbeam, and a polymeric hanger hanging the roof crossbeam underneath the sunroof assembly. The sunroof assembly includes a guiderail, and the guiderail includes an upper rim. The hanger includes a lower hook hooked with the roof crossbeam underneath the guiderail, and fixedly located on the roof crossbeam, an upper hook hooked with the upper rim from above, and fixedly located on the guiderail, and a semi-rigid strip extending between the lower hook and the upper hook. The strip includes a bend. The bend is configured to interiorly engage the guiderail to establish a lowermost hanging position of the roof crossbeam relative to the guiderail, flexibly accommodate lifting movement of the roof crossbeam relative to the guiderail, interiorly disengage the guiderail in response to the lifting movement, and thereafter flexibly accommodate multidirectional movement of the roof crossbeam relative to the guiderail.

In yet another aspect, a mounting package includes a sunroof assembly, a roof crossbeam, and a hanger hanging the roof crossbeam underneath the sunroof assembly. The sunroof assembly includes a guiderail. The roof crossbeam includes an aperture, a pair of sidewall sections in spaced opposition about the aperture, and a bordering area around the aperture. The hanger includes a lower hook hooked with the bordering area from below, and an upper hook hooked with the guiderail. The lower hook is configured to insert into the aperture from above to engage the bordering area from above, and turn inside the aperture to hook with the bordering area from below, and opposingly engage the sidewall sections from beside. The hanger is configured to flexibly accommodate multidirectional movement of the roof crossbeam relative to the guiderail. The multidirectional movement includes lifting movement of the roof crossbeam relative to the guiderail.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a mounting package that includes a sunroof assembly, a roof crossbeam, and a pair of hangers for hanging the roof crossbeam underneath the sunroof assembly. While fixedly located on the roof crossbeam and on the guiderails, the hangers are configured to hang the roof crossbeam from the guiderails. Using the hangers, the mounting package conveniently packages the sunroof assembly and the roof crossbeam for handling, including for transport purposes, staging purposes and, in particular, mounting purposes.

Each hanger includes a toggle-based lower hook for hooking with the roof crossbeam, and an opposing pocket-based upper hook for hooking with the guiderail. For each hanger, the roof crossbeam includes an aperture for the lower hook, in relation to which the lower hook has an insert-and-turn configuration for hooking with the roof crossbeam. Moreover, the guiderail includes an upper rim for the upper hook, in relation to which the upper hook has a push configuration for hooking with the guiderail. In addition to the lower hook and the upper hook, each hanger includes a semi-rigid strip extending therebetween for flexibly accommodating multidirectional movement of the roof crossbeam relative to the guiderail.

Figure 1A:
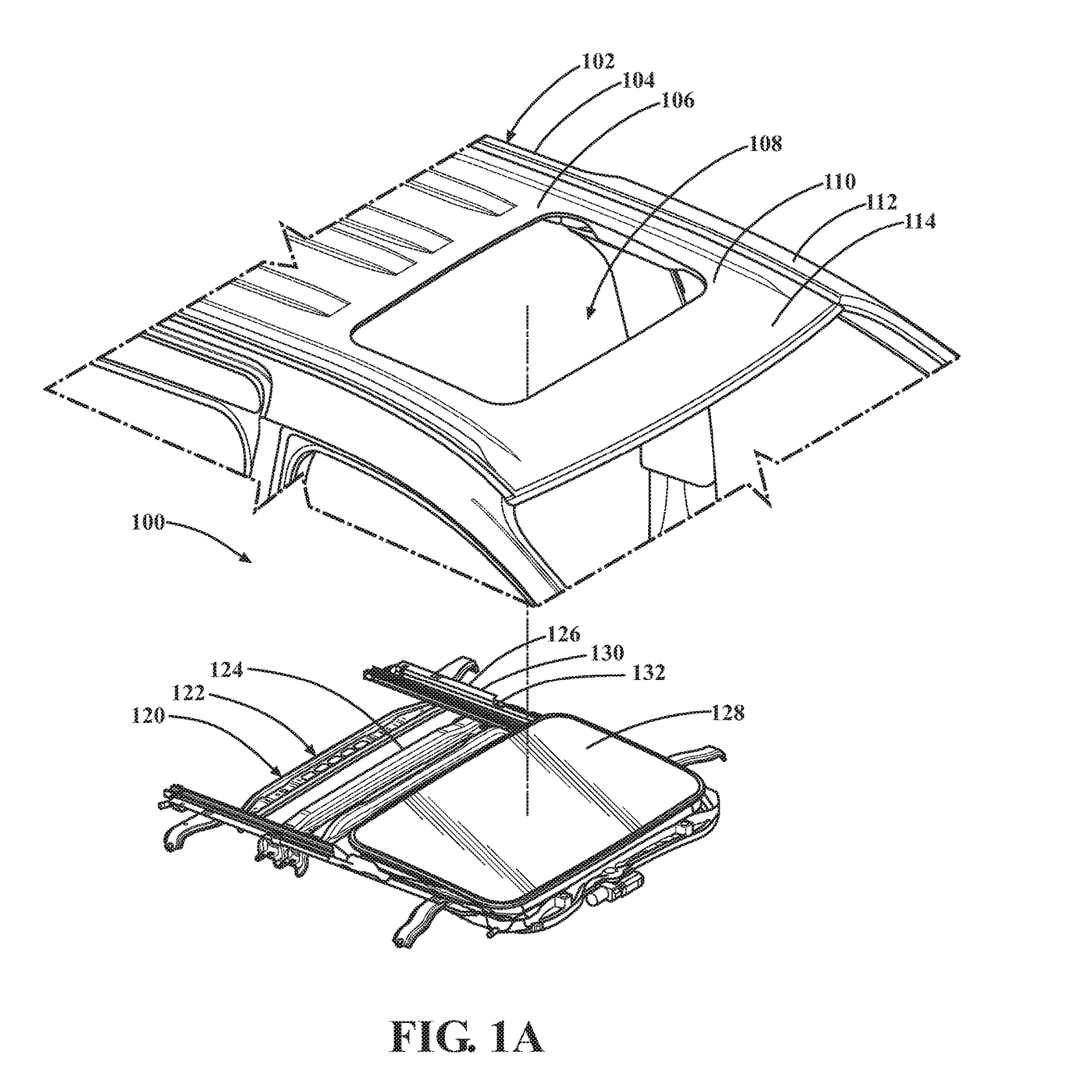
FIG. 1A is an assembly view of a vehicle whose body includes a sunroof opening, roof rails and a roof crossbeam, showing a sunroof assembly that is mountable to the body from below via securement to the roof rails, and a roof crossbeam that is mountable into the body from below underneath the sunroof assembly via securement to the roof rails, as well as a hanger-based mounting package for packaging the sunroof assembly and the roof crossbeam.

Part of a representative passenger vehicle 100 is shown in FIG. 1A. In this description, uses of "front," "forward" and the like, and uses of "rear," "rearward" and the like, refer to the longitudinal directions of the vehicle 100. "Front," "forward" and the like refer to the front (fore) of the vehicle 100, while "rear," "rearward" and the like refer to the back (aft) of the vehicle 100. Uses of "side," "sideways," "transverse" and the like refer to the lateral directions of the vehicle 100. Uses of "above," "below" and the like refer to the vertical directions of the vehicle 100.

The vehicle 100 includes an exterior and a number of interior compartments. The compartments include a passenger compartment, an engine compartment, a cargo area and the like. Among other things, the vehicle 100 may include seats, a dash assembly, an instrument panel, controls and the like housed in the passenger compartment. Additionally, the vehicle 100 may include an engine, a motor, a transmission and the like, as well as other powertrain components, such as wheels, housed in the engine compartment and elsewhere in the vehicle 100. The wheels support the remainder of the vehicle 100 on the ground. One, some or all of the wheels are powered by the remainder of the powertrain components to drive the vehicle 100 along the ground.

The vehicle 100 includes a body 102 that forms the exterior and defines or otherwise encloses the compartments. The body 102 includes two upright sides 104 and a horizontal roof 106, as shown, as well as a floor, a front end, a rear end and the like. The body 102 is constructed from any combination of rigidly interconnected frame members, panels and other body elements, as well as any combination of overlying paneling, trim, upholstery and other body coverings. The body elements may have any combination of fabricated, bent, stamped, extruded, casted, molded and like constructions, and may be made from any combination of metallic, polymeric and like materials.

The roof 106 extends laterally between the sides 104. As part of the roof 106, the body 102 includes a sunroof opening 108 that opens between the passenger compartment and the exterior. Moreover, the body 102 includes a roof panel 110 that defines the sunroof opening 108. Moreover, the body 102 includes a pair of roof rails 112 and, as part of the roof panel 110, a roof header 114, that frame 126 the sunroof opening 108. The roof rails 112 are laterally spaced apart from one another about the sunroof opening 108, and extend longitudinally. The roof panel 110 extends longitudinally from the roof header 114, and laterally between the roof rails 112. The roof header 114 is forward of the sunroof opening 108, and extends laterally between the roof rails 112.

As shown, the vehicle 100, including the body 102, is in a partially assembled state. In the partially assembled state, the roof rails 112 and the roof panel 110, including the roof header 114, are secured to one another. The roof panel 110, including the roof header 114, is secured to the roof rails 112 along its length. The roof header 114, as part of the roof panel 110, is secured to the roof rails 112 at its ends.

In relation to the roof 106 and the sunroof opening 108, the vehicle 100 includes a mounting package 120 that includes a sunroof assembly 122 and a roof crossbeam 124. As shown, the sunroof assembly 122 and the roof crossbeam 124 are mountable, but yet to be mounted, into the vehicle 100 from below.

In addition to a peripheral frame 126 and a glass or otherwise see-through sunroof panel 128 corresponding to the sunroof opening 108, the sunroof assembly 122 includes one or more sunshades, driving equipment for the sunroof panel 128 and the sunshades, and like elements typical of sunroof assemblies. Although the sunroof assembly 122, as shown, includes one sunroof panel 128, it will be understood that this disclosure is applicable in principle to otherwise similar vehicles whose sunroof assemblies include multiple sunroof panels. As part of the frame 126, the sunroof assembly 122 includes a pair of peripheral guiderails 130 for guiding the sunroof panel 128, the sunshades and the driving equipment. The guiderails 130 are laterally spaced apart from one another about the sunroof panel 128, with the same lateral spacing as the roof rails 112, and extend longitudinally. The sunroof panel 128 is slidingly connected to the guiderails 130 for longitudinal movement, by the driving equipment, between a forward position and a rearward position.

To further the assembly of the vehicle 100, with the sunroof panel 128 vertically aligned with the sunroof opening 108, and the guiderails 130 vertically aligned with the roof rails 112, the sunroof assembly 122 is mountable to the body 102, over the sunroof opening 108, from below. To mount to the body 102, the sunroof assembly 122 is secured to the body 102 by the frame 126. Specifically, the guiderails 130 are secured to the roof rails 112 along their lengths. With the sunroof assembly 122 mounted to the body 102, the forward position of the sunroof panel 128 is a closed position over the sunroof opening 108, and the rearward position of the sunroof panel 128 is an open position away from the sunroof opening 108.

In addition to the sunroof assembly 122, the vehicle 100, as part of the mounting package 120, includes the roof crossbeam 124. Although the body 102, as shown, includes one roof crossbeam 124, it will be understood that this disclosure is applicable in principle to otherwise similar vehicles whose bodies include multiple roof crossbeams. The roof crossbeam 124 is meant to become part of the body 102 as a structural reinforcement. Specifically, the roof crossbeam 124 is a rigidifying structural reinforcement for a side impact. When the body 102 is compromised by a side impact event, the roof crossbeam 124, from a location extending laterally between the roof rails 112, structurally reinforces the body 102 against the sides 104 laterally intruding into the passenger compartment.

To further the assembly of the vehicle 100, with the roof crossbeam 124 vertically aligned rearward of the sunroof opening 108 and laterally between the roof rails 112, the roof crossbeam 124 is mountable into the body 102 from below. To mount into the body 102, and thereby become part of the body 102, the roof crossbeam 124 is secured to the roof rails 112 at its ends. With the roof crossbeam 124 mounted into the body 102, the roof header 114 and the roof crossbeam 124 are longitudinally spaced apart from one another about the sunroof opening 108.

As shown, the sunroof assembly 122 is mountable to the body 102 overtop the roof crossbeam 124. Contrariwise, the roof crossbeam 124 is mountable into the body 102 underneath the sunroof assembly 122, whereupon the ends of the roof crossbeam 124 are underneath the guiderails 130. According to the assembly of the vehicle 100 set forth above, the guiderails 130 and the roof crossbeam 124 have an independent mounting relationship with the body 102. As part of the independent mounting relationship, the guiderails 130 and the ends of the roof crossbeam 124 are vertically spaced apart from one another. Moreover, the guiderails 130 and the roof crossbeam 124, although both secured to the roof rails 112, are not secured to one another. Instead, to assume their own final locations on the roof rails 112, the guiderails 130 and the roof crossbeam 124 are secured to the roof rails 112 independently of one another. After the relatively lower-rigidity sunroof assembly 122 is mounted to the body 102, the independent mounting relationship prevents the frame 126 and, in particular, the guiderails 130, from being overstressed, distorted, dislodged or otherwise structurally compromised when the roof crossbeam 124 is mounted into the body 102.

Figure 1B:
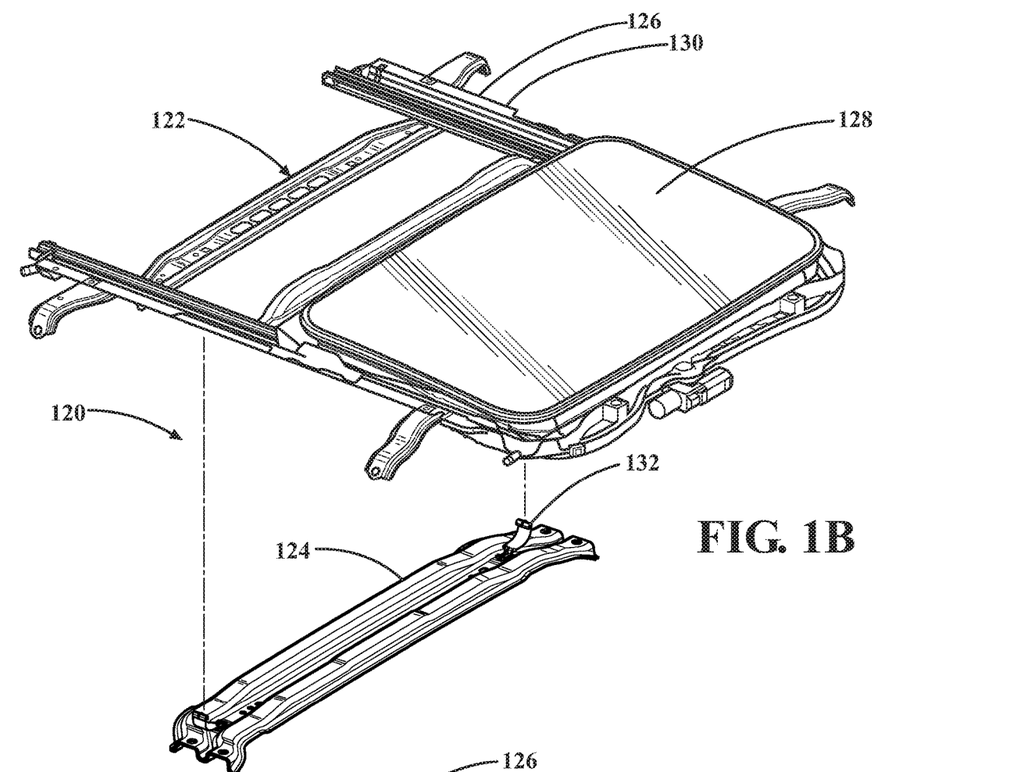
FIG. 1B is an assembly view of the mounting package, showing the sunroof assembly and the roof crossbeam, as well as hangers for hanging the roof crossbeam underneath the sunroof assembly.

As shown with additional reference to FIG. 1B, the mounting package 120, in addition to the sunroof assembly 122 and the roof crossbeam 124, includes a pair of hangers 132 for hanging the roof crossbeam 124 underneath the sunroof assembly 122. As set forth below, while fixedly located on the roof crossbeam 124 and on the guiderails 130, the hangers 132 are configured to hang the roof crossbeam 124 from the guiderails 130. Specifically, the hangers 132 are configured to hang the roof crossbeam 124 from the guiderails 130 by its ends rearward of the sunroof panel 128, and extending laterally between the guiderails 130, with its ends underneath the guiderails 130. For packaging purposes, the hangers 132 are configured to establish a lowermost hanging position of the roof crossbeam 124 relative to the guiderails 130. Otherwise, the hangers 132 are configured to flexibly accommodate multidirectional movement of the roof crossbeam 124 relative to the guiderails 130.

Using the hangers 132, the mounting package 120 conveniently packages the sunroof assembly 122 and the roof crossbeam 124 for handling, including for transport purposes, staging purposes and, in particular, mounting purposes. For mounting purposes, the entire mounting package 120 may be lifted underneath the final locations of the guiderails 130 and the roof crossbeam 124 on the roof rails 112. After the sunroof assembly 122 is mounted to the body 102, but before the roof crossbeam 124 is mounted into the body 102, the hangers 132 temporarily suspend the roof crossbeam 124 underneath its final location on the roof rails 112, in vertical alignment rearward of the sunroof opening 108 and laterally between the roof rails 112. When the roof crossbeam 124 is mounted into the body 102, with the guiderails 130 having assumed their final locations on the roof rails 112, the hangers 132 flexibly accommodate the independent mounting relationship and, in particular, any necessary multidirectional movement, including but not limited to lifting movement, of the roof crossbeam 124 relative to the guiderails 130 to assume its own final location on the roof rails 112. For instance, in addition to the lifting movement, the multidirectional movement includes any combination of longitudinal movement of the roof crossbeam 124 relative to the guiderails 130, and lateral movement of the roof crossbeam 124 relative to the guiderails 130.

The use of the hangers 132 minimizes the packaging space of the sunroof assembly 122 and the roof crossbeam 124, reduces costs associated with the assembly of the vehicle 100, and simplifies the assembly of the vehicle 100, while improving worker safety, by obviating the need to separately lift the roof crossbeam 124 underneath its final location on the roof rails 112. After the roof crossbeam 124 is mounted into the body 102, the hangers 132 may remain in the vehicle 100 as part of the mounting package 120 without adding significant mass, generating noise during operation, or compromising the structural integrity of the sunroof assembly 122, the roof crossbeam 124 or the roof rails 112. Alternatively, the hangers 132 may be removed from the roof crossbeam 124 and the roof rails 112 for reuse in a subsequent mounting package 120.

Figure 1C:
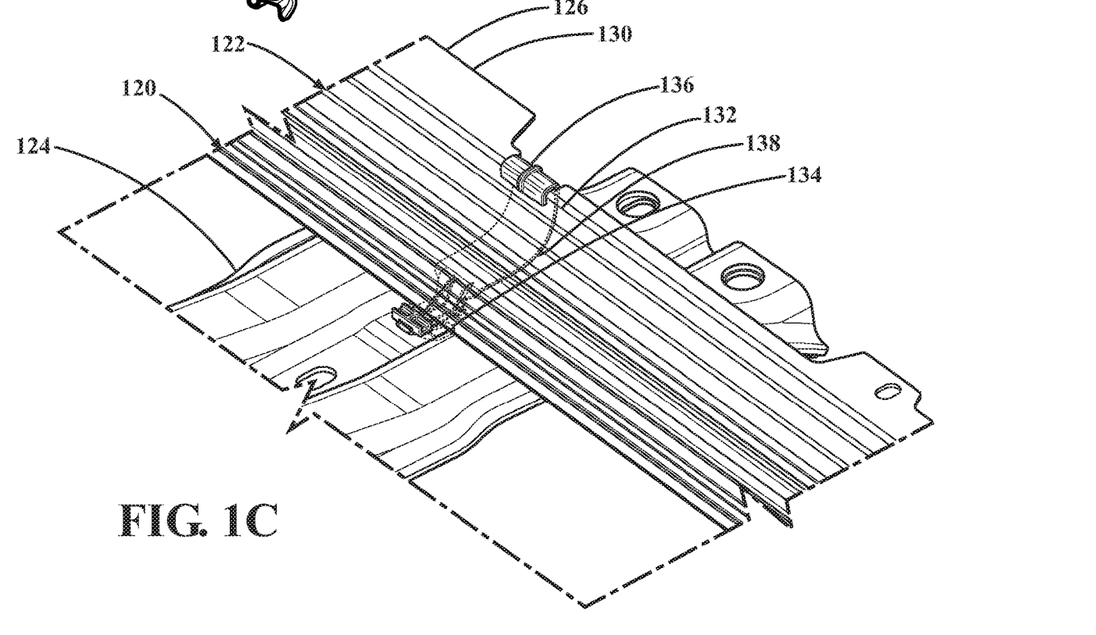
FIG. 1C is a detailed perspective view of the mounting package, showing a representative end of the roof crossbeam, a representative guiderail of the sunroof assembly, and a representative hanger for hooking with the roof crossbeam and with the guiderail to hang the roof crossbeam from the guiderail.

As shown with additional reference to FIG. 1C for a representative hanger 132, a representative end of the roof crossbeam 124 and a representative guiderail 130 (with the other hanger 132, the other end of the roof crossbeam 124 and the other guiderail 130 being mirror images), to hang the roof crossbeam 124 from the guiderail 130, the hanger 132 is configured to hook with the roof crossbeam 124 and with the guiderail 130. Specifically, the hanger 132 is configured to hook with the roof crossbeam 124 at its end and with the guiderail 130 along its length.

Figures 2A, 2B, 2C:
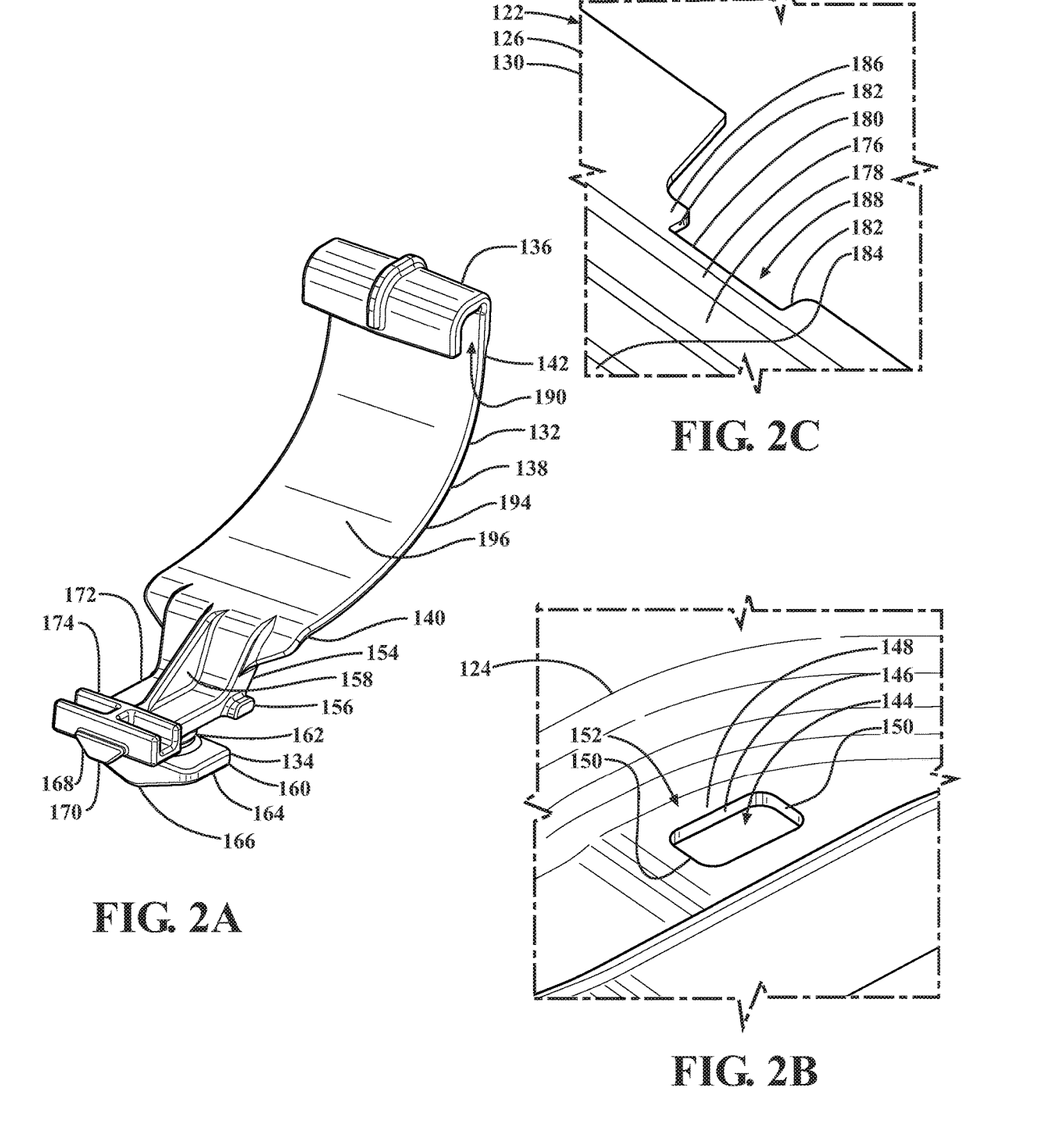
FIG. 2A is a perspective view of the hanger from FIG. 1C, showing a toggle-based lower hook for hooking with the roof crossbeam, an opposing pocket-based upper hook for hooking with the guiderail, and a semi-rigid strip extending between the lower hook and the upper hook for flexibly accommodating multidirectional movement of the roof crossbeam relative to the guiderail.
FIG. 2B is a detailed perspective view of the end of the roof crossbeam from FIG. 1C, showing an aperture for the lower hook, in relation to which the lower hook has an insert-and-turn configuration for hooking with the roof crossbeam.
FIG. 2C is a detailed perspective view of the guiderail from FIG. 1C, showing an upper rim for the upper hook, in relation to which the upper hook has a push configuration for hooking with the guiderail.

The hanger 132, the end of the roof crossbeam 124 and the guiderail 130 from FIG. 1C are shown in additional detail in FIGS. 2A, 2B and 2C, respectively. The hanger 132 is made from one or more polymeric materials suitable to impart both rigidity for rigid, load-bearing hooking with the roof crossbeam 124 and with the guiderail 130, and semi-rigidity for flexibly accommodating multidirectional movement of the roof crossbeam 124 relative to the guiderail 130 when the roof crossbeam 124 is temporarily suspended underneath its final location on the roof rails 112. For instance, the hanger 132 may have a unitarily formed construction, and be made from resin, and thereby be formed as a single resin piece. Moreover, the hanger 132 may have various geometries for favoring both rigidity and semi-rigidity.

As shown with particular reference to FIG. 2A, the hanger 132 is elongate and includes, along its length, a rigid lower hook 134 for hooking with the roof crossbeam 124, an opposing rigid upper hook 136 for hooking with the guiderail 130, and a semi-rigid strip 138 extending between the lower hook 134 and the upper hook 136 for flexibly accommodating multidirectional movement of the roof crossbeam 124 relative to the guiderail 130. With the strip 138 including a horizontal lower end 140 and an upright upper end 142, the lower hook 134 extends from the lower end 140, and the upper hook 136 extends from the upper end 142. In a double-ended configuration, the lower hook 134 and the upper hook 136 are at opposing ends of the hanger 132. The lower hook 134 is configured to hook with and fixedly locate on the roof crossbeam 124 at its end, and the upper hook 136 is configured to hook with and fixedly locate on the guiderail 130 along its length.

As shown with particular reference to FIGS. 2A and 2B, at its end, the roof crossbeam 124 includes an aperture 144 for the lower hook 134. In relation to the aperture 144, the roof crossbeam 124 includes a sidewall 146 and a bordering area 148 immediately leading from the sidewall 146. Moreover, as part of the sidewall 146, the roof crossbeam 124 includes a pair of sidewall sections 150 in spaced opposition about the aperture 144. In one instance, the aperture 144 is elongated. In one instance, the aperture 144 is substantially rectangular. In one instance, the roof crossbeam 124, in its role as a side impact beam, includes a bead 152 for increased rigidity, and at its end, includes the aperture 144, the sidewall 146 and the bordering area 148 at the bottom of the bead 152.

In relation to the roof crossbeam 124 and, in particular, the aperture 144, the lower hook 134 has an insert-and-turn configuration for hooking with the roof crossbeam 124. According to the insert-and-turn configuration, the lower hook 134 is configured to insert into the aperture 144 from above, and turn inside the aperture 144 to hook with the bordering area 148 from below. Specifically, the lower hook 134 is configured to insert into the aperture 144 from above to engage the bordering area 148 from above, and turn inside the aperture 144 to hook with the bordering area 148 from below, and opposingly engage the sidewall sections 150 from beside. The lower hook 134 is thereby configured not only to hook with the bordering area 148 from below, but also to fixedly locate on the roof crossbeam 124. In one instance, the lower hook 134 is configured to quarter-turn inside the aperture 144. Contrariwise, for removal from the roof crossbeam 124, the lower hook 134 is configured to counterturn inside the aperture 144 to unhook from the bordering area 148 from below, and withdraw from the aperture 144 from above. In one instance, the lower hook 134 is configured to counter-quarter-turn inside the aperture 144.

As noted above, the lower end 140 of the strip 138 is horizontal, and the lower hook 134 extends from the lower end 140. The lower hook 134 extends from the strip 138 underneath and outward from the lower end 140. Specifically, the lower hook 134 includes an upright spacer 154 extending downwardly from the lower end 140, and a horizontal base 156 extending outwardly from the spacer 154. For support 174 to the strip 138, the lower hook 134 includes an upright gusset 158 extending between the spacer 154 and the base 156. In one instance, the connection from the lower end 140 to the spacer 154 is angular. In one instance, the connection from the lower end 140 to the spacer 154 forms a substantially right angle.

In relation to the base 156, the lower hook 134 includes an inverted T-shaped toggle 160. The toggle 160 extends from the base 156 underneath and crosswise to the base 156. Specifically, the toggle 160 includes an upright post 162 extending downwardly from the base 156, and a horizontal cross arm 164 extending crosswise from the post 162 in spaced opposition with the base 156. According to the spaced opposition of the base 156 and the cross arm 164, the lower hook 134 includes an upward-facing top face defined by the cross arm 164 in parallel spaced opposition with a downward-facing bottom face defined by the base 156. The cross arm 164 includes a tip 166 configured to guide the lower hook 134, leading with the cross arm 164, into the aperture 144 from above by sliding over the junction between the bordering area 148 and the sidewall 146. In one instance, the tip 166 is tapered. In one instance, the tip 166 includes two angled tip faces that converge to a point.

Moreover, the lower hook 134 includes a tooth 168. The tooth 168 extends slightly outward and slightly underneath the base 156. Specifically, the tooth 168, from a distal location on the base 156, extends downwardly from the base 156 in spaced opposition with the post 162. The tooth 168 includes a tip 170 configured to guide the tooth 168 into the aperture 144 from above by sliding over the junction between the bordering area 148 and the sidewall 146. In one instance, the tip 170 is tapered. In relation to the toggle 160 and the tooth 168, the base 156 includes a main body 172 leading from the spacer 154, from which the post 162 extends, and a support 174 leading from the main body 172, from which the tooth 168 extends. The support 174 is substantially rectangular, and outwardly overhangs the toggle 160. With the main body 172 being rigid, the support 174 has a substantially H-shaped configuration that imparts semi-rigidity for flexing.

The footprint of the base 156 corresponds to the footprint of the bordering area 148. In one instance, similarly to the aperture 144, the base 156 is elongated. In one instance, similarly to the aperture 144, the base 156 is substantially rectangular. When the lower hook 134 is inserted into the aperture 144 from above, the base 156 is configured to engage the bordering area 148 from above. In conjunction with the base 156, the tooth 168 is also configured to engage the bordering area 148 from above. Notably, only the lower hook 134 is configured to insert into the aperture 144 from above. However, to turn the lower hook 134 inside the aperture 144, the entire hanger 132 is configured to turn. Accordingly, with the aperture 144 being at the bottom of the bead 152, the length of the spacer 154 corresponds to the depth of the bead 152. After the lower hook 134 is inserted into the aperture 144 from above, the spacer 154, from inside the bead 152, is configured to support the remainder of the hanger 132 overtop the bead 152 for interference-free turning.

With respect to the toggle 160, the footprint of the cross arm 164 corresponds to the footprint of the aperture 144. In one instance, similarly to the aperture 144, the cross arm 164 is elongated. In one instance, similarly to the aperture 144, the cross arm 164 is substantially rectangular. The length of the post 162, and the spaced opposition of the base 156 and the cross arm 164, correspond to the depth of the sidewall 146. When the lower hook 134 is inserted into the aperture 144 from above, the cross arm 164 is configured to pass underneath the aperture 144. Relatedly, after the lower hook 134 is inserted into the aperture 144 from above, the post 162, from inside the aperture 144, is configured to support the cross arm 164 underneath the aperture 144. Moreover, the lower hook 134 is configured to turn inside the aperture 144 about the post 162. When the lower hook 134 is turned inside the aperture 144 about the post 162, the cross arm 164, from below the aperture 144, is configured to hook with the bordering area 148 from below.

With respect to the tooth 168, the spaced opposition of the post 162 and the tooth 168 corresponds to the spaced opposition of the sidewall sections 150. When the lower hook 134 is turned inside the aperture 144 about the post 162, the post 162 and the tooth 168, from inside the aperture 144, are configured to opposingly engage the sidewall sections 150 from beside.

Figure 3:
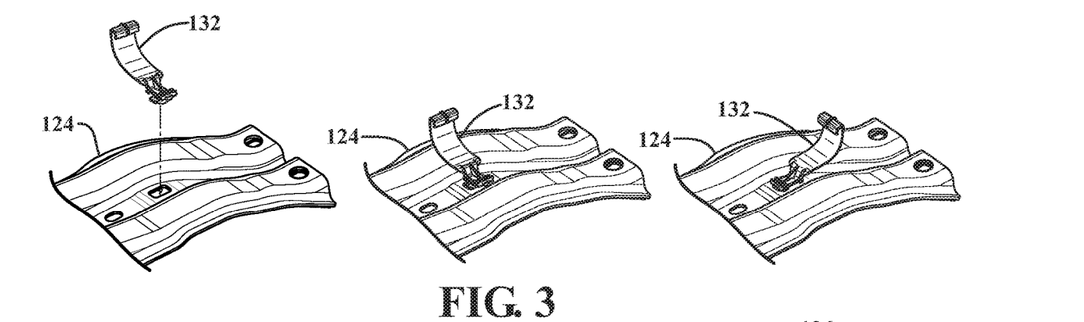
FIG. 3 includes partial perspective views of the end of the roof crossbeam from FIG. 1C, and perspective views of the hanger from FIG. 1C, showing aspects of the insert-and-turn configuration.

As shown with additional reference to FIG. 3, according to the insert-and-turn configuration set forth above, the lower hook 134, leading with the cross arm 164, is inserted into the aperture 144 from above, whereupon the cross arm 164 passes underneath the aperture 144, and the base 156 engages the bordering area 148 from above. As noted above, the tip 166 of the cross arm 164 guides the lower hook 134 into the aperture 144 from above. After the lower hook 134 is inserted into the aperture 144 from above, the post 162 is left inside the aperture 144, from where the post 162 supports the cross arm 164 underneath the aperture 144, and the spacer 154 is left inside the bead 152, from where the spacer 154 supports the remainder of the hanger 132 overtop the bead 152 for interference-free turning. The tooth 168, in conjunction with the base 156, also engages the bordering area 148 from above.

Next, the lower hook 134 is turned inside the aperture 144 about the post 162, whereupon the cross arm 164 hooks with the bordering area 148 from below, and the post 162 and the tooth 168 opposingly engage the sidewall sections 150 from beside. Specifically, when the lower hook 134 is initially partially turned inside the aperture 144 about the post 162, the tooth 168 swings about the post 162 toward the aperture 144, whereupon the tooth 168 pushes against the bordering area 148 from above, and the support 174 is left forcibly flexed. The tooth 168 is thereby biased for entry into the aperture 144 from above. When the lower hook 134 is fully turned inside the aperture 144 about the post 162, the tooth 168 swings about the post 162 to the aperture 144, whereupon the tooth 168, responsive to the bias therefor, enters into the aperture 144 from above, and the support 174 is left relaxed. The tooth 168 is thereby biased against exit from the aperture 144 from above. As noted above, the tip 170 of the tooth 168 guides the tooth 168 into the aperture 144 from above. The tooth 168 thereby joins the post 162 inside the aperture 144, from where the post 162 and the tooth 168 opposingly engage the sidewall sections 150 from beside. The lower hook 134 is thereby not only hooked with the bordering area 148 from below, but also fixedly located on the roof crossbeam 124.

Among other things, it follows that when the lower hook 134 is fully turned inside the aperture 144 about the post 162, the lower hook 134, via the tooth 168 being biased for entry into the aperture 144 from above, includes a shared bias for hooking with the bordering area 148 from below and fixedly locating on the roof crossbeam 124. Relatedly, the lower hook 134, via the tooth 168, responsive to the bias therefor, entering into the aperture 144 from above, is configured to generate a shared tactile and/or audible snap-like indication that the lower hook 134 is hooked with the bordering area 148 from below and fixedly located on the roof crossbeam 124. Contrariwise, with respect to the lower hook 134 being counterturned inside the aperture 144 about the post 162, the lower hook 134, via the tooth 168 being biased against exit from the aperture 144 from above, includes a bias against removal from the roof crossbeam 124.

As shown with particular reference to FIGS. 2A and 2C, along its length, the guiderail 130 includes an upper rim 176 for the upper hook 136. As part of the upper rim 176, the guiderail 130 includes an upright outer wall 178, and a horizontal edge flange 180 extending outwardly from the outer wall 178. Moreover, in relation to the upper rim 176, the guiderail 130 includes a pair of horizontal tabs 182 extending outwardly in spaced opposition about the upper rim 176. Specifically, the guiderail 130 includes a horizontal lower wall 184, the outer wall 178 extending upwardly from the lower wall 184, and a horizontal upper wall 186 extending outwardly from the outer wall 178. Moreover, as part of the upper wall 186, the guiderail 130 includes a notch 188 that leaves a residual area of the upper wall 186 to form the edge flange 180 and the tabs 182.

Figure 4:
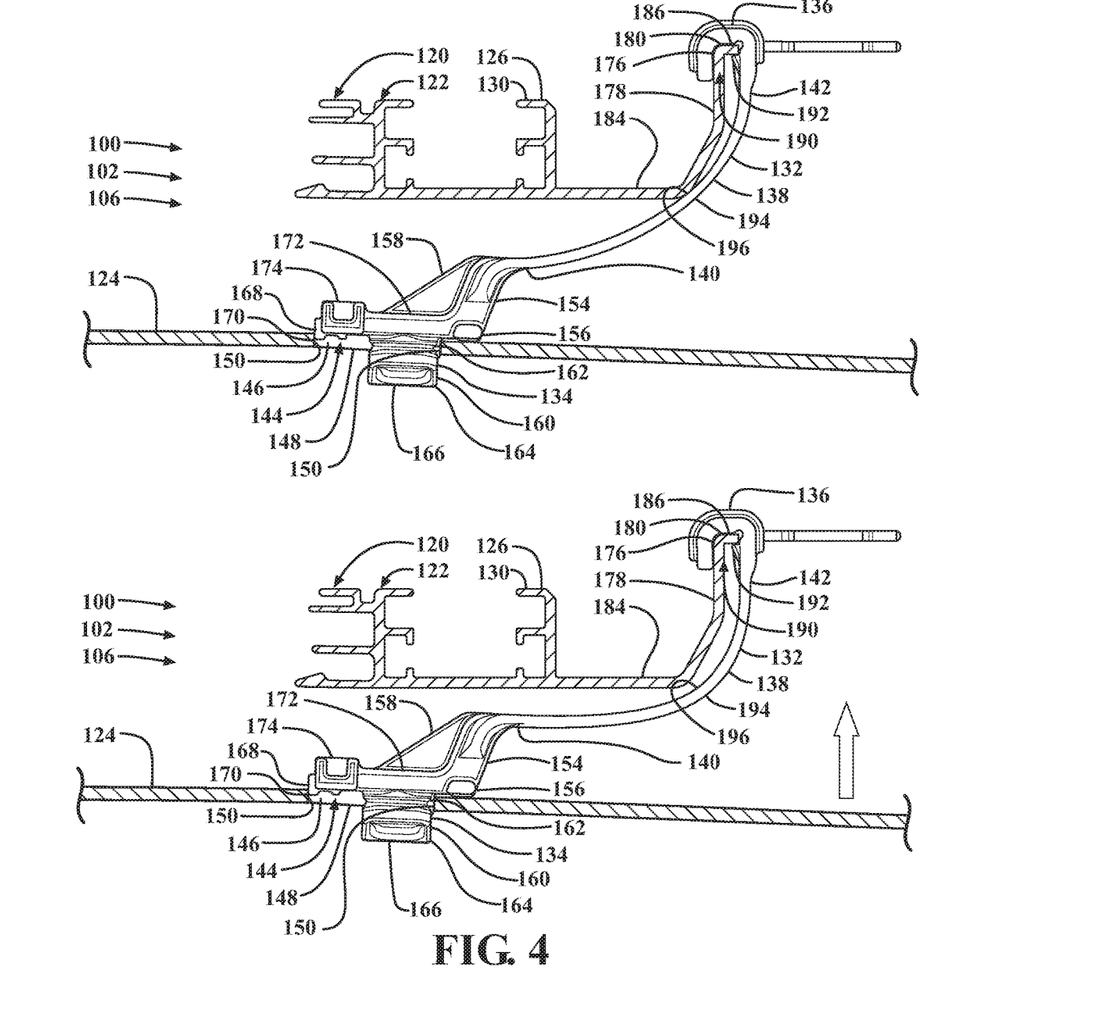
FIG. 4 includes partial cross-sectional views of the vehicle after the sunroof assembly is mounted to the body, showing aspects of the hangers temporarily suspending the roof crossbeam underneath its final location on the roof rails before the roof crossbeam is mounted into the body, and flexibly accommodating multidirectional movement of the roof crossbeam relative to the guiderails when the roof crossbeam is mounted into the body.

As shown with additional reference to FIG. 4, in relation to the guiderail 130 and, in particular, the upper rim 176, the upper hook 136 has a push configuration for hooking with the guiderail 130. According to the push configuration, the upper hook 136 is configured to push onto the upper rim 176 from above to hook with the upper rim 176 from above. Specifically, the upper hook 136 is configured to push onto the upper rim 176 from above to not only hook with the upper rim 176 from above, but also opposingly engage the tabs 182 from beside. The upper hook 136 is thereby configured not only to hook with the upper rim 176 from above, but also to fixedly locate on the guiderail 130. Contrariwise, for removal from the guiderail 130, the upper hook 136 is configured to pull off the upper rim 176 from above to unhook from the upper rim 176 from above.

As noted above, the upper end 142 of the strip 138 is upright, and the upper hook 136 extends from the upper end 142. The upper hook 136 extends from the strip 138 upward, inward and over from the upper end 142. Specifically, the upper hook 136 includes an inverted U-shaped pocket 190 extending inwardly from the upper end 142. As part of the pocket 190, the upper hook 136 includes a projection 192 extending slightly inwardly from the pocket 190.

The profile of the pocket 190 corresponds to the profile of the upper rim 176 along the outer wall 178 and the edge flange 180. When the upper hook 136 is pushed onto the upper rim 176 from above, the pocket 190 is configured to hook with the upper rim 176 from above. As part of hooking with the upper rim 176 from above, the pocket 190 is configured to enter the projection 192 underneath the edge flange 180 from above by sliding the projection 192 around the edge flange 180. Relatedly, the upper hook 136, via the projection 192 entering underneath the edge flange 180 from above, is configured to generate a tactile and/or audible snap-like indication that the upper hook 136 is hooked with the upper rim 176 from above.

Moreover, the width of the pocket 190 corresponds to the spaced opposition of the tabs 182. When the upper hook 136 is pushed onto the upper rim 176 from above, the pocket 190 is configured to opposingly engage the tabs 182 from beside. The upper hook 136 is thereby not only hooked with the upper rim 176 from above, but also fixedly located on the guiderail 130.

With the lower hook 134 hooked with the roof crossbeam 124 at its end, and the end of the roof crossbeam 124 being underneath the guiderail 130, the lower hook 134 is hooked with the roof crossbeam 124 underneath the guiderail 130. With the lower hook 134 hooked with the roof crossbeam 124 underneath the guiderail 130, and the upper hook 136 hooked with the upper rim 176 from above, the lower end 140 of the strip 138 is horizontal, and the upper end 142 of the strip 138 is upright, as noted above. Relatedly, the strip 138 includes a bend 194 between the lower end 140 and the upper end 142 for extending between the lower hook 134 and the upper hook 136. In relation to the bend 194, the strip 138 includes a concave inner surface 196 facing the guiderail 130. The bend 194 is configured to interiorly engage the guiderail 130 and, in combination with that of the other, mirror image hanger 132, thereby establish the lowermost hanging position of the roof crossbeam 124 relative to the guiderails 130. Moreover, the bend 194 is configured to interiorly disengage the guiderail 130 in response to lifting movement of the roof crossbeam 124 relative to the guiderail 130. Moreover, after the bend 194 interiorly disengages the guiderail 130, the bend 194 is configured to flexibly accommodate further multidirectional movement of the roof crossbeam 124 relative to the guiderails 130.

The contour of the bend 194 corresponds to the profile of the guiderail 130 along the lower wall 184 and the outer wall 178, up to and including the upper rim 176. From underneath the guiderail 130, where the lower hook 134 is hooked with the roof crossbeam 124, the bend 194 is configured to reach along the lower wall 184, past the junction between the lower wall 184 and the outer wall 178, and along the outer wall 178, up to and including the upper rim 176, where the upper hook 136 is hooked with the guiderail 130.

As shown with particular reference to FIG. 4, after the hanger 132 hangs the roof crossbeam 124 from the guiderail 130, including after the sunroof assembly 122 is mounted to the body 102, but before the roof crossbeam 124 is mounted into the body 102, the bend 194 is configured to flexibly open under the weight of the roof crossbeam 124, whereupon the inner surface 196 engages the guiderail 130 at the junction between the lower wall 184 and the outer wall 178. The bend 194, in combination with that of the other, mirror image hanger 132, thereby establishes the lowermost hanging position of the roof crossbeam 124 relative to the guiderails 130. When the roof crossbeam 124 is mounted into the body 102, the bend 194 is configured to flexibly accommodate lifting movement of the roof crossbeam 124 relative to the guiderail 130. Specifically, the bend 194 is configured to flexibly close absent the weight of the roof crossbeam 124, whereupon the inner surface 196 disengages the guiderail 130, including at the junction between the lower wall 184 and the outer wall 178. Moreover, after the inner surface 196 disengages the guiderail 130, the bend 194 is configured to flexibly accommodate any combination of longitudinal movement of the roof crossbeam 124 relative to the guiderail 130, and lateral movement of the roof crossbeam 124 relative to the guiderail 130. After the roof crossbeam 124 is mounted into the body 102, the bend 194 is left flexibly closed absent the weight of the roof crossbeam 124, and the inner surface 196 is left disengaging the guiderail 130.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A mounting package, comprising:
   a sunroof assembly, the sunroof assembly including a guiderail;
   a roof crossbeam; and
   a hanger hanging the roof crossbeam underneath the sunroof assembly, the hanger including a lower hook hooked with the roof crossbeam, and an upper hook hooked with the guiderail, the hanger configured to flexibly accommodate multidirectional movement of the roof crossbeam relative to the guiderail, the multidirectional movement including lifting movement of the roof crossbeam relative to the guiderail.

2. The mounting package of claim 1, wherein the hanger includes a semi-rigid strip extending between the lower hook and the upper hook, the strip including a bend, the bend configured to interiorly engage the guiderail to establish a lowermost hanging position of the roof crossbeam relative to the guiderail, interiorly disengage the guiderail in response to the lifting movement, and thereafter flexibly accommodate further of the multidirectional movement.

3. The mounting package of claim 1, wherein the roof crossbeam includes an aperture and a bordering area around the aperture, and the lower hook is hooked with the bordering area from below.

4. The mounting package of claim 3, wherein the lower hook includes a shared bias for hooking with the bordering area from below and fixedly locating on the roof crossbeam.

5. The mounting package of claim 1, wherein the roof crossbeam includes an aperture and a bordering area around the aperture, and to hook with the roof crossbeam, the lower hook is configured to insert into the aperture from above, and turn inside the aperture to hook with the bordering area from below, and for removal from the roof crossbeam, the lower hook is configured to counterturn inside the aperture to unhook from the bordering area from below, and withdraw from the aperture from above.

6. The mounting package of claim 1, wherein the roof crossbeam includes an aperture, a pair of sidewall sections in spaced opposition about the aperture, and a bordering area around the aperture, and to hook with the roof crossbeam, the lower hook is configured to insert into the aperture from above to engage the bordering area from above, and turn inside the aperture to hook with the bordering area from below, and opposingly engage the sidewall sections from beside.

7. The mounting package of claim 1, wherein the guiderail includes an upper rim, and the upper hook is hooked with the upper rim from above.

8. The mounting package of claim 1, wherein the guiderail includes an upper rim, the lower hook is hooked with the roof crossbeam underneath the guiderail, and the upper hook is hooked with the upper rim from above.

9. The mounting package of claim 1, wherein the hanger is polymeric.

10. The mounting package of claim 1, wherein the lower hook is fixedly located on the roof crossbeam, and the upper hook is fixedly located on the guiderail.

11. A mounting package, comprising:
    a sunroof assembly, the sunroof assembly including a guiderail, the guiderail including an upper rim;
    a roof crossbeam; and
    a polymeric hanger hanging the roof crossbeam underneath the sunroof assembly, the hanger including a lower hook hooked with the roof crossbeam underneath the guiderail, and fixedly located on the roof crossbeam, an upper hook hooked with the upper rim from above, and fixedly located on the guiderail, and a semi-rigid strip extending between the lower hook and the upper hook, the strip including a bend, the bend configured to interiorly engage the guiderail to establish a lowermost hanging position of the roof crossbeam relative to the guiderail, flexibly accommodate lifting movement of the roof crossbeam relative to the guiderail, interiorly disengage the guiderail in response to the lifting movement, and thereafter flexibly accommodate multidirectional movement of the roof crossbeam relative to the guiderail.

12. The mounting package of claim 11, wherein the roof crossbeam includes an aperture and a bordering area around the aperture, and the lower hook is hooked with the bordering area from below.

13. The mounting package of claim 12, wherein the lower hook includes a shared bias for hooking with the bordering area from below and fixedly locating on the roof crossbeam.

14. The mounting package of claim 11, wherein the roof crossbeam includes an aperture and a bordering area around the aperture, and to hook with the roof crossbeam, the lower hook is configured to insert into the aperture from above, and turn inside the aperture to hook with the bordering area from below, and for removal from the roof crossbeam, the lower hook is configured to counterturn inside the aperture to unhook from the bordering area from below, and withdraw from the aperture from above.

15. The mounting package of claim 11, wherein the roof crossbeam includes an aperture, a pair of sidewall sections in spaced opposition about the aperture, and a bordering area around the aperture, and to hook with the roof crossbeam, the lower hook is configured to insert into the aperture from above to engage the bordering area from above, and turn inside the aperture to hook with the bordering area from below, and opposingly engage the sidewall sections from beside.

16. A mounting package, comprising:
a sunroof assembly, the sunroof assembly including a guiderail;
a roof crossbeam, the roof crossbeam including an aperture, a pair of sidewall sections in spaced opposition about the aperture, and a bordering area around the aperture; and
a hanger hanging the roof crossbeam underneath the sunroof assembly, the hanger including a lower hook hooked with the bordering area from below, and an upper hook hooked with the guiderail, the lower hook configured to insert into the aperture from above to engage the bordering area from above, and turn inside the aperture to hook with the bordering area from below, and opposingly engage the sidewall sections from beside, the hanger configured to flexibly accommodate multidirectional movement of the roof crossbeam relative to the guiderail, the multidirectional movement including lifting movement of the roof crossbeam relative to the guiderail.

17. The mounting package of claim 16, wherein the hanger includes a semi-rigid strip extending between the lower hook and the upper hook, the strip including a bend, the bend configured to interiorly engage the guiderail to establish a lowermost hanging position of the roof crossbeam relative to the guiderail, interiorly disengage the guiderail in response to the lifting movement, and thereafter flexibly accommodate further of the multidirectional movement.

18. The mounting package of claim 16, wherein for removal from the roof crossbeam, the lower hook is configured to counterturn inside the aperture to unhook from the bordering area from below, and withdraw from the aperture from above.

19. The mounting package of claim 16, wherein the guiderail includes an upper rim, and the upper hook is hooked with the upper rim from above.

20. The mounting package of claim 16, wherein the hanger is polymeric.

\* \* \* \* \*